Jan. 14, 1964     G. A. SILL ETAL     3,118,057
APPARATUS FOR THE AUTOMATIC DETECTION OF RECURRING MAXIMUM
AND MINIMUM VALUES OF A FLUCTUATING VARIABLE OR SIGNAL
Filed Sept. 28, 1960
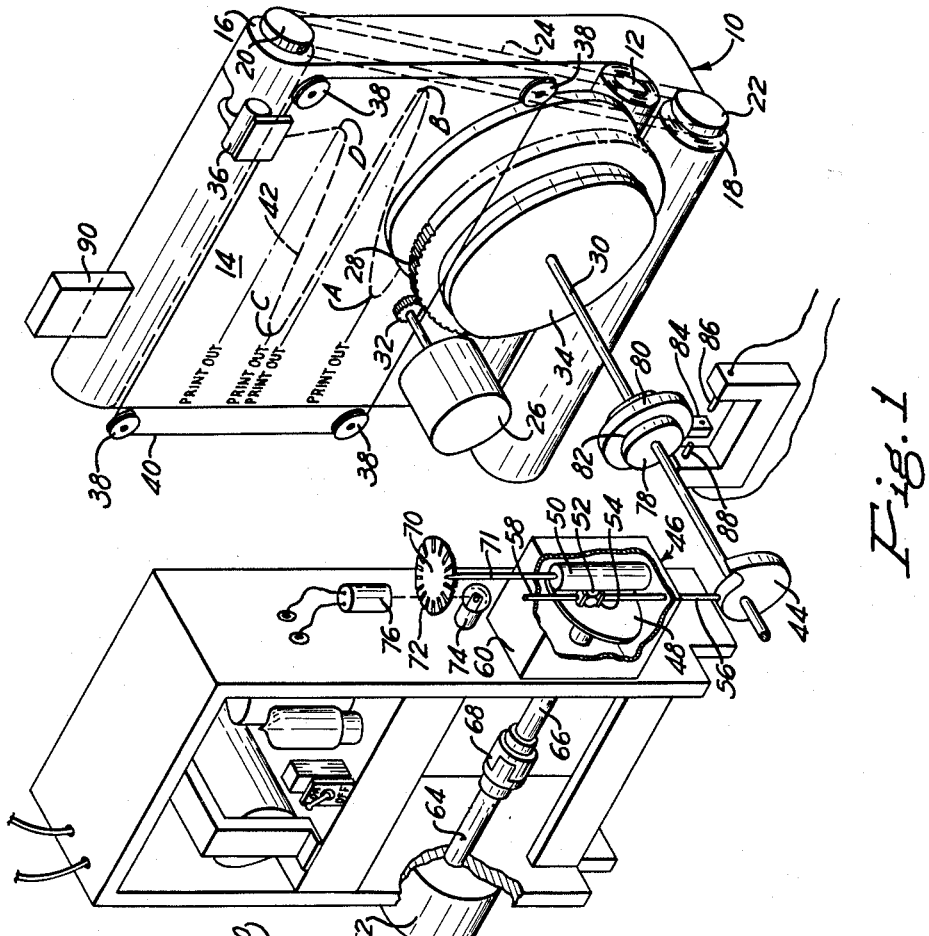
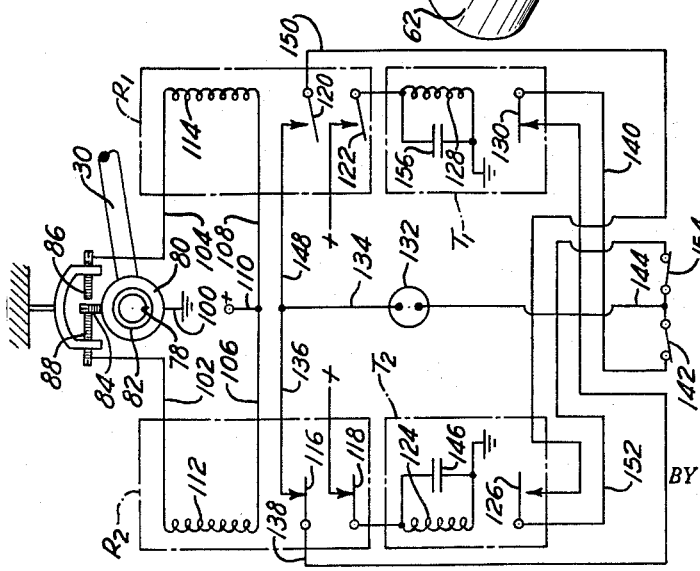
INVENTORS
GUSTAVE A. SILL
WILLIAM O. WEATHERFORD, JR.
BY COURT L. WOLFE
ATTORNEY

United States Patent Office 3,118,057
Patented Jan. 14, 1964

3,118,057
APPARATUS FOR THE AUTOMATIC DETECTION OF RECURRING MAXIMUM AND MINIMUM VALUES OF A FLUCTUATING VARIABLE OR SIGNAL
Gustave A. Sill, Pittsburgh, Pa., William D. Weatherford, Jr., San Antonio, Tex., and Court L. Wolfe, Pittsburgh, Pa., assignors to Gulf Research & Development Company, Pittsburgh, Pa., a corporation of Delaware
Filed Sept. 28, 1960, Ser. No. 58,984
12 Claims. (Cl. 235—183)

This invention relates to an apparatus for the automatic detection of recurring maximum and minimum values of a fluctuating variable or signal.

An especial advantage of the apparatus of this invention is that it allows signaling of maximum and minimum points of a first variable, as would be indicated by a record of values of this variable versus a second variable such as time, at the same or differing values of the first variable rather than only at fixed set points. Therefore, where such a record exhibits recurring maximum and minimum points the apparatus of this invention permits signaling of all such maximum and minimum points as they occur even though no two maximum or minimum points occur at the same value.

The apparatus employed comprises measuring means for measuring a variable, moveable output means responsive to said measuring means, the extent of movement of said output means being proportional to the output signal of said measuring means, moveable contact means on said output means moveable with said output means, said moveable contact means being disposed between a pair of spaced external opposing fixed contacts in electrical circuit with a maximum-minimum signaling means, said moveable contact means being moveable with said output means only until engagement is made between said moveable contact means and an external fixed contact whereupon said moveable contact means is only moveable with said output means upon reversal of direction of movement of said output means, such reversal of direction of movement causing concomitant disengagement between said moveable contact and external fixed contact, said disengagement electrically effecting response in said maximum-minimum signaling device.

The moveable output means of the measuring instrument on which the moveable contact is mounted can be constructed for either linear or rotary motion. Since rotary measuring output means are generally available, for example, the shaft driving a recorder pen, the switch is advantageously adapted for mounting upon a rotary output means such as a rotatable shaft. Such a rotary shaft generally rotates only a fraction of a revolution to cover the entire scale range of the instrument.

When the moveable output means of the measuring instrument comprises a rotary shaft, a friction collar having a switch contact extending radially outward from a point on its circumference is fitted around the shaft. This contact is the moveable contact and is disposed between a pair of external fixed contacts. The collar is fastened around the shaft with only a sufficient degree of tightness so that it rotates together with the shaft as a single rigid body when the moveable contact is not engaged by an external fixed contact but with an insufficient degree of tightness to permit rotation of the collar with the shaft after the moveable contact has engaged an external contact. In this manner the external fixed contacts act as mechanical stops or obstructions and upon contact with the moveable contact prevent further rotation of the collar with the rotary shaft until the rotary shaft reverses its direction of rotation. Upon such reversal of direction the collar, because of its frictional attachment to the shaft, again rotates together with the shaft as a single rigid body until the moveable contact again engages an external fixed contact which thereupon prevents further rotation of the collar with the rotary shaft until the rotary shaft again reverses its direction of rotation.

It is seen that when the moveable contact meets an external fixed contact and the shaft continues to rotate in the same direction, the collar acts as a slip clutch and ceases to rotate while the shaft continues to rotate in that direction. This slip clutch action continues until the direction of rotation of the shaft is reversed, whereupon the friction between the collar and the shaft causes the collar to rotate with the shaft until either contact is made with the other external fixed contact or until the moveable contact returns to the same fixed contact without first engaging the other external fixed contact.

Although the switching means can be employed to actuate any electrically operated device, in a particularly advantageous embodiment of this invention the switching means is employed to actuate the print-out and clearing mechanism of an integrator to which is being fed the output signal of the measuring instrument and which integrates the variable being measured with respect to time. The use of the switching means of this invention cooperatively with a measuring instrument and integrator equipped with print-out means can effect recurring print-outs of the total of the quantity being measured which has accrued only between consecutive minimum and maximum points of the measured variable. Print-out of the total count accruing between adjacent minimum and maximum points followed by clearing of the integrator occurs substantially concomitantly with the occurrence of each minimum and maximum value of the variable being measured. If desired, such print-out and clearing can be caused to occur only at succeeding minimum points as indicated by a record of the measured variable or only at succeeding maximum points as indicated by a record of the measured variable.

It is a particularly advantageous embodiment of this invention that the integrator print-out and clearing means or whatever other signal is being employed to indicate or record occurrence of minimum and maximum points in the value of the measured variable be actuated upon disengagement of the moveable contact from an external fixed contact rather than upon engagement of the moveable contact with an external fixed contact. By causing such actuation to occur only upon disengagement of the moving contact from a fixed contact the signal is actuated substantially concurrently with occurrence of the minimum or maximum point since such occurrence is first detectable only upon instantaneous change of direction of rotation of the output means of the measuring instrument which, because of the frictional engagement between this output means and the moveable contact collar, causes concomitant disengagement of the moveable contact from the external fixed contact with which it is in contact. Therefore, disengagement is the occurrence which most precisely indicates maxima and minima. On the other hand, if actuation of the signal means were to occur upon engagement of the moveable contact with the opposite fixed external contact such actuation would have to await travel of the moveable contact across the gap between the pair of fixed external contacts. Such travel of the moveable switch across this gap prior to the signaling of a maximum or minimum would unnecessarily introduce an error and therefore the signal would not be actuated concomitantly with maximum or minimum occurrence. This error can be considerable since in some processes the gap between the fixed external contacts might have to be relatively great in order to avoid continual electrical chattering or excessively frequent print-outs.

This invention is more completely illustrated by reference to the accompanying drawings in which FIGURE 1 shows the combination of a recorder, slip clutch switch and integrator and FIGURE 2 shows the electrical circuits for actuating an integrator print-out and clearing mechanism of which the slip clutch switch is a part.

Referring to FIGURE 1, the numeral 10 indicates generally a self-balancing potentiometric strip chart recorder. The recorder 10 comprises a supply roll of chart paper 12 from which chart paper 14 is entrained over a roll 16 and take-up roll 18. The rolls 16 and 18 are provided with pulleys 20 and 22, respectively, over which a belt 24 is entrained, and means, not shown, is provided for driving the rolls 16 and 18 at such a rate that the speed of advance of the chart paper 14 over the roll 16 is constant. Means, not shown, is provided to maintain tension on the chart paper 14 as it passes between the rolls 16 and 18.

The balancing motor 26 of the self-balancing recorder 10 is drivingly connected to a spur gear 28 fixed upon a slide wire shaft 30 by means of a small pinion gear 32 carried on the shaft of the motor 26. Secured to the slide wire shaft 30 in a position adjacent the gear 28 is a drum or disk 34 by means of which a recording pen 36 is driven in relation to the chart paper 14 as it passes over the roll 16. The arrangement for driving the pen 36 from the drum 34 comprises four idler pulleys 38 over which an endless pen drive cable 40 is entrained, with the portion of the cable 40 passing between the lowermost of the pulleys 38 being looped about the drum 34, as shown. The recording pen 36 is secured by any suitable means to the cable 40 at a position intermediate the uppermost of the pulleys 38, it being understood that the pen 36 is provided with suitable guiding means to maintain the same in proper contact with the chart paper 14.

Thus, the motor 26 rotates the slide wire shaft 30 through the driving connection established by the gears 28 and 32. The shaft 30 in turn causes the drum 34 to rotate therewith, thus causing linear movement of the cable 40 and the pen 36, so that the pen 36 marks upon the chart paper 14 a tracing 42 which is equivalent to a record of the angular displacement of the shaft 30 versus time. It will be understood of course that inasmuch as the angular position of the shaft 30 is directly proportional to the value of the variable electrical input signal being recorded the trace 42 constitutes a record of such input signal versus time.

The description of apparatus for integrating the angular displacement of the shaft 30 (the angular displacement of the shaft 30 being proportional to the instantaneous value of the input signal being recorded) with respect to time follows. The shaft 30 has fixed thereon a constant rise cam 44. A conventional mechanical integrating device is indicated generally at 46, the same comprising a disk 48, a cylinder 50 mounted to rotate about an axis normal to the axis of the disk 48, and a pair of balls 52 disposed between the disk 48 and the cylinder 50. The pair of balls 52 constitute motion transferring means and establish a frictional driving connection between the disk 48 and the cylinder 50 and are carried in a sleeve 54. The sleeve 54 is secured at one side to a cam follower 56 and at the other side to a support arm 58. The cam follower 56 and the support arm 58 slidably extend through suitable openings in the opposite sides of a housing 60 provided for integrating device 46, the arrangement being such that the pair of balls 52 are free to travel only along a path parallel to the axis of the cylinder 50.

The end of the cam follower 56 remote from the pair of balls 52 slidingly engages the constant rise cam 44. If deemed necessary or expedient, spring or weighting means, not shown, can be provided for yieldingly urging the cam follower 56 into continuous engagement with the cam 44. As thus far described, it will be evident that the pair of balls 52 will be caused to move along a path parallel to the axis of the cylinder 50 to an extent proportional to the angular displacement of the shaft 30. Normally, the position of the cam 44 on the shaft 30 or the length of the cam follower 56 is such that the pair of balls 52 is positioned centrally of the disk 48 when the shaft 30 is in the angular position occupied by it when the value of the input signal is zero.

Means is provided for rotating the disk 48 which comprises a constant speed electric motor 62, motor 62 being drivingly connected to the disk 48 by means of a motor shaft 64, and a shaft 66 centrally secured to the disk 48, with the adjacent ends of the shaft 64 and 66 being coupled together as at 68.

The means for measuring the angular displacement of the cylinder 50 in part comprises means for producing an electrical signal upon each equal increment of angular displacement of the cylinder 50, which, in the preferred construction, takes the form of a disk 70 fixed upon an axial shaft 71 carried by the cylinder 50. The shaft 71 can be considered the output shaft of the mechanical integrating device. The disk 70 is provided with a plurality of equally spaced peripheral notches 72 that extend entirely around the circumference of the disk 70. An electric lamp 74 and a photoelectric cell 76 are disposed on opposite sides of the disk 70 in such an arrangement that light from the lamp 74 reaches the photoelectric cell 76 only when one of the notches 72 is disposed directly thereinbetween. With such an arrangement, rotation of the cylinder 50 results in the photoelectric cell 76 being intermittently illuminated by light from the lamp 74 as the notches 72 pass therebetween. The cell 76 produces an electrical potential or signal upon each occurrence of equal increments of rotation of the cylinder 50.

The integrator count is continuously transferred by means not shown to print-out and clearing device 90, located in print-out proximity to chart 14. Print-out on chart 14 followed by clearing is caused to occur at print-out and clearing device 90 when this device is actuated by switch means on shaft 30 between drum 34 and cam 44. The switch means comprises in part a hub 78 which constitutes an enlargement of shaft 30 and which is integral with or fixedly attached to shaft 30. The purpose of hub 78 is to provide an enlarged line of contact 82 for the frictional inner surface of collar 80 with which hub 78 is in contact. Line of contact 82 between hub 78 and collar 80 is of sufficient length to provide positive frictional contact between hub 78 and collar 80 so that collar 80 rotates rigidly with shaft 30 until switch contact 84 engages one or the other of external fixed contacts 86 and 88. Following such engagement the shaft 30 remains free to continue rotation in the same direction and hub 78 slidingly rotates past collar 80. Upon reversal of direction of rotation of shaft 30 the frictional contact between hub 78 and collar 80 causes the collar to rotate with the shaft until engagement is again made between switch contact 84 and an external fixed contact whereupon the sequence is repeated. In this manner the switch operates as a floating maximum and minimum detector.

Reference to tracing 42 on chart paper 14 indicates a set of maximum points A and C and a set of minimum points B and D. At minimum point B moveable contact 84 is in engagement with fixed contact 86. As the tracing proceeds from minimum point B to maximum point C, instantaneous disengagement between contacts 84 and 86 occurs. As shown in FIGURE 2, this disengagement results in a demand for print-out and clearing at print-out mechanism 90 at the time designation on chart paper 14 at which minimum point B occurred. The digital figure produced on chart paper 14 corresponds to the area under the curve between points A and B. In the course of pen travel away from minimum point B toward maximum point C shaft 30 rotates clockwise and after moveable contact 84 traverses the gap between fixed contacts 86 and 88 it engages contact 88 and remains in engagement therewith until the pen again reverses direction after passing maximum point C. This reversal of direction causes print-out at maximum point C of a digital figure corresponding to the area under the curve between points B and C, followed by clearing. The sequence is again repeated at subsequent minimum and maximum points.

FIGURE 2 illustrates an electrical circuit for causing print-out and clearing upon direction reversal of shaft 30. The circuit of FIGURE 2 contains two pairs of relays, one pair designated as $R_2$ and $T_2$, respectively, and the other pair designated as $R_1$ and $T_1$, respectively. In relay $R_2$, coil 112 actuates switches 116 and 118 in unison and in relay $T_2$ coil 124 actuates switch 126. In relay $R_1$, coil 114 actuates switches 120 and 122 and in relay $T_1$, coil 128 actuates switch 130.

The movement of contact 84 between fixed contacts 86 and 88 is similar to the operation of a single-pole double-throw switch. When moveable contact 84 engages fixed contact 88 a circuit is completed from ground wire 100 through 80, 84, 88, 102, 112, 106 and 110, thereby energizing coil 112. At the same time coil 114 of relay $R_1$ is de-energized. Upon energization of coil 112, switches 116 and 118 are closed. Thereupon, a circuit is completed through print demand switch 132 associated with print-out device 90, 134, 136, 116, 138, normally closed switch 130, 140, manual switch 142, and 144. At the same time a circuit is completed through switch 118 and coil 124, thereby energizing both coil 124 and capacitor 146 which is in parallel with coil 124.

With the print demand switch circuit closed, integration and counting proceeds until the direction of rotation of shaft 30 is reversed whereupon moveable contact 84 disengages from fixed contact 88 causing coil 112 to become de-energized, thereby opening switches 116 and 118 and thereby interrupting current flow through print demand switch 132 and causing print-out and clearing on chart 14 of FIGURE 1. If movement of shaft 30 is relatively rapid and contact 84 instantaneously engages opposing fixed contact 86 the print and clearing mechanism will not have sufficient time for mechanical operation before it is reactuated by energization of relay $R_1$. Therefore, such instantaneous re-energization is prevented by means of capacitor 146 in relay $T_2$ which contains a sufficient residual charge to maintain coil 124 energized, thereby preventing closure of switch 126 and preventing current flow through print demand switch 132, for a sufficient length of time to allow the printing mechanism to print-out and clear itself before counting starts again. Capacitor 146 is of adequate size to provide the necessary time lapse, for example, about 0.2 second.

Upon engagement between moveable contact 84 and fixed contact 86 a circuit is completed through ground wire 100, 80, 84, 86, 104, 114, 108 and 110, thereby energizing coil 114 of relay $R_1$. Energization of coil 114 actuates closure of switches 120 and 122. Closure of switch 122 results in energization of coil 128, thereby opening normally closed switch 130. Closure of switch 120 completes a circuit through 120, 150, normally closed switch 126, 152, manual switch 154, 144, 132, 134 and 148, thereby initiating integrating and counting which proceeds until print-out again occurs upon disengagement of contacts 84 and 86. Upon such disengagement, capacitor 156 operates as a time delay means to allow a sufficient hold-up interval for the print-out mechanism to print and clear prior to commencing integration again.

Both fixed contacts 86 and 88 are equipped with kerfs for independent adjustment relative to moveable contact 84. Excessively close adjustment will result in excessive print-outs while excessively wide adjustment will result in unnecessary introduction of error. With both of manual switches 142 and 154 closed, print-out and clearing occurs at each successive maximum and minimum point. If desired, either of switches 142 or 154 can be manually opened so that print-out and clearing occurs only at adjacent maximum points or only at adjacent minimum points.

Various changes and modifications may be made without departing from the spirit of this invention and the scope thereof as defined in the following claims.

We claim:
1. An apparatus comprising measuring means for measuring a variable, moveable output means responsive to said measuring means, moveable contact means on said output means moveable with said output means, said moveable contact means being disposed between a pair of spaced external opposing fixed contacts in circuit with a maximum-minimum signaling means, said moveable contact means being moveable with said output means until engagement is made between said moveable contact means and an external fixed contact whereupon said moveable contact means is only moveable with said output means upon reversal of direction of movement of said output means, such reversal of direction of movement causing concomitant disengagement between said moveable contact and external fixed contact.

2. An apparatus comprising measuring means for measuring a variable, moveable output means responsive to said measuring means, the extent of movement of said output means being proportional to the output of said measuring means, moveable contact means on said output means moveable with said output means, said moveable contact means being disposed between a pair of spaced external opposing fixed contacts in circuit with a maximum-minimum signaling means, said moveable contact means only being moveable with said output means until engagement is made between said moveable contact means and an external fixed contact whereupon said moveable contact means is only moveable with said output means upon reversal of direction of movement of said output means, such reversal of direction of movement causing concomitant disengagement between said moveable contact and external fixed contact, said disengagement effecting response in said maximum-minimum signaling device.

3. An apparatus comprising measuring means for measuring a variable, rotatable output means responsive to said measuring means, the extent of rotation of said output means being proportional to the output of said measuring means, moveable contact means on said output means rotatable with said output means, said moveable contact means being disposed between a pair of spaced external opposing fixed contacts in circuit with a maximum-minimum signaling means, said moveable contact means only being rotatable with said output means until engagement is made between said moveable contact means and an external fixed contact whereupon said moveable contact means is only rotatable with said output means upon reversal of direction of rotation of said output means, said reversal of direction of rotation causing concomitant disengagement between said moveable contact and external fixed contact, said disengagement effecting response in said maximum-minimum signaling device.

4. An apparatus comprising measuring means for measuring a first variable, integrating means for integrating the measurement with respect to a second variable, said integrating means having a print-out means, at least one moveable output means responsive to the output of said measuring means, at least one of said output means extending between said measuring means and said integrating means for transmitting the output of the measuring means to the integrating means, moveable contact means mounted upon at least one of said output means, said moveable contact means being disposed between a pair of external opposing fixed contacts electrically connected to said print-out means, said moveable contact means being moveable with said output means until engagement is made between said moveable contact means and an external fixed contact whereupon said moveable contact means is only moveable with said output means upon reversal of direction of movement of said output means, such reversal of direction of movement of said output means causing concomitant disengagement between said moveable contact and external fixed contact.

5. An apparatus comprising measuring means for measuring a first variable, integrating means for integrating the measurement with respect to a second variable, said integrating means having a print-out means, at least one moveable output means responsive to the output of said measuring means, at least one of said output means extending between said measuring means and said integrating means for transmitting the output of the measuring means to the integrating means, moveable contact means mounted upon at least one of said output means, said moveable contact means being disposed between a pair of external opposing fixed contacts electrically connected to said print-out means, said moveable contact means being moveable with said output means until engagement is made between said moveable contact means and an external fixed contact whereupon said moveable contact means is only moveable with said output means upon reversal of direction of movement of said output means, such reversal of direction of movement of said output means causing concomitant disengagement between said moveable contact and external fixed contact, said disengagement electrically effecting print-out at said print-out means.

6. An apparatus comprising measuring means for measuring a variable, integrating means for integrating the measurement with respect to time, said integrating means having a print-out and clearing means, at least one moveable output means responsive to the output of said measuring means, at least one of said output means extending between said measuring means and said integrating means for transmitting the output of the measuring means to the integrating means, moveable contact means mounted upon at least one of said output means, said moveable contact means being disposed between a pair of external opposing fixed contacts electrically connected to said print-out and clearing means, said moveable contact means being moveable with said output means until engagement is made between said moveable contact means and an external fixed contact whereupon said moveable contact means is only moveable with said output means upon reversal of direction of movement of said output means, such reversal of direction of movement of said output means causing concomitant disengagement between said moveable contact means and external fixed contact, said disengagement electrically effecting print-out and clearing at said print-out and clearing means, and time delay means to allow sufficient time for print-out and clearing to occur prior to recommencing integration following print-out.

7. An apparatus comprising measuring means for measuring a variable, integrating means for integrating the measurement with respect to time, said integrating means having a print-out means, at least one rotary means responsive to the output of said measuring means, at least one of said rotary means extending between said measuring means and said integrating means for transmitting the output of the measuring means to the integrating means, moveable contact means mounted upon one of said rotary means, said moveable contact means being disposed between a pair of external opposing fixed contacts electrically connected to said print-out means, said moveable means being rotatable with said rotary means until engagement is made between said moveable contact means and an external fixed contact whereupon said moveable contact means is only rotatable with said rotary means upon reversal of direction of rotation of said rotary means, such reversal of direction of rotation of said rotary means causing concomitant disengagement between said moveable contact means and external fixed contact, said disengagement electrically effecting print-out at said print-out means.

8. An apparatus comprising measuring means for measuring a variable, moveable output means responsive to said measuring means, moveable contact means on said output means moveable with said output means, an external fixed contact in circuit with a signaling means disposed in the path of movement of said moveable contact means, said moveable contact means being moveable with said output means only until engagement is made between said moveable contact means and said external fixed contact whereupon said moveable contact means is moveable with said output means only upon reversal of direction of movement of said output means, such reversal of direction of movement causing concomitant disengagement between said moveable contact and said external fixed contact.

9. An apparatus comprising measuring means for measuring a variable, moveable output means responsive to said measuring means, the extent of movement of said output means being proportional to the output of said measuring means, moveable contact means on said output means moveable with said output means, an external fixed contact in circuit with a signaling means disposed in the path of movement of said moveable contact means, said moveable contact means being moveable with said output means only until engagement is made between said moveable contact means and said external fixed contact whereupon said moveable contact means is moveable with said output means only upon reversal of direction of movement of said output means, such reversal of direction of movement causing concomitant disengagement between said moveable contact and said external fixed contact, said disengagement effecting response in said signaling means.

10. An apparatus comprising measuring means for measuring a variable, moveable output means responsive to said measuring means, moveable contact means on said output means moveable with said output means, said moveable contact means being disposed between a pair of spaced external opposing fixed contacts in circuit with a maximum-minimum signaling means, said moveable contact means being moveable with said output means until engagement is made between said moveable contact means and an external fixed contact whereupon said moveable contact means is only moveable upon reversal of direction of movement of said output means, such reversal of direction of movement causing concomitant disengagement between said moveable contact and external fixed contact.

11. An apparatus comprising measuring means for measuring a variable, moveable output means responsive to said measuring means, the extent of movement of said output means being proportional to the output of said measuring means, moveable contact means on said output means frictionally moveable with said output means, said moveable contact means being disposed between a pair of spaced external opposing fixed contacts in circuit with a maximum-minimum signaling means, said moveable contact means only being moveable with said output means until engagement is made between said moveable contact means and an external fixed contact whereupon said moveable contact means is only moveable upon reversal of direction of movement of said output means, such reversal of direction of movement causing concomitant disengagement between said moveable contact and external fixed contact, said disengagement effecting response in said maximum-minimum signaling device.

12. An apparatus comprising measuring means for measuring a variable, moveable output means responsive to said measuring means, moveable contact means on said output means moveable with said output means, an external fixed contact in circuit with a signaling means disposed in the path of movement of said moveable contact means, said moveable contact means being moveable with said output means only until engagement is made between said moveable contact means and said external fixed contact whereupon said moveable contact means is moveable only upon reversal of direction of movement of said output means, such reversal of direction of movement causing concomitant disengagement between said moveable contact and said external fixed contact.

References Cited in the file of this patent

UNITED STATES PATENTS

| | | |
|---|---|---|
| 740,547 | Fiske | Oct. 6, 1903 |
| 2,733,391 | Mayer | Jan. 31, 1956 |
| 2,967,749 | Strickler | Jan. 10, 1961 |
| 3,028,213 | Hall et al. | Apr. 3, 1962 |